(12) United States Patent
Ionescu

(10) Patent No.: US 7,499,958 B1
(45) Date of Patent: Mar. 3, 2009

(54) SYSTEMS AND METHODS OF REPLICATING ALL OR PART OF A DATA STORE

(75) Inventor: Mihai Florin Ionescu, Mountain View, CA (US)

(73) Assignee: Google Inc., Mountain View, CA (US)

(*) Notice: Subject to any disclaimer, the term of this patent is extended or adjusted under 35 U.S.C. 154(b) by 505 days.

(21) Appl. No.: 10/813,888

(22) Filed: Mar. 31, 2004

(51) Int. Cl.
*G06F 12/00* (2006.01)

(52) U.S. Cl. .................... 707/204; 711/161; 711/162

(58) Field of Classification Search .............. 707/100, 707/1, 204; 709/203; 711/161, 162
See application file for complete search history.

(56) References Cited

U.S. PATENT DOCUMENTS

| | | | | |
|---|---|---|---|---|
| 5,765,172 | A * | 6/1998 | Fox | 707/204 |
| 5,806,079 | A * | 9/1998 | Rivette et al. | 715/512 |
| 6,006,222 | A | 12/1999 | Culliss | |
| 6,014,665 | A | 1/2000 | Culliss | |
| 6,078,916 | A | 6/2000 | Culliss | |
| 6,170,014 | B1 * | 1/2001 | Darago et al. | 709/229 |
| 6,182,068 | B1 | 1/2001 | Culliss | |
| 6,421,675 | B1 * | 7/2002 | Ryan et al. | 707/100 |
| 6,581,056 | B1 | 6/2003 | Rao | |
| 2003/0167266 | A1 | 9/2003 | Saldanha et al. | |
| 2004/0133544 | A1 * | 7/2004 | Kiessig et al. | 707/1 |
| 2004/0143569 | A1 | 7/2004 | Gross et al. | |
| 2005/0027757 | A1 * | 2/2005 | Kiessig et al. | 707/204 |
| 2005/0033803 | A1 * | 2/2005 | Vleet et al. | 709/203 |

OTHER PUBLICATIONS

U.S. Appl. No. 10/749,440, filed Dec. 31, 2003, Badros et al.
80-20 Software—Products—80-20 One Search, http://www.80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web," IBM Research, http://www.almaden.ibm.com/cs/wbi/papers/chi97/whipaper.html, pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.

(Continued)

*Primary Examiner*—Hung T Vy
*Assistant Examiner*—Michael Le
(74) *Attorney, Agent, or Firm*—Fenwick & West LLP

(57) ABSTRACT

Systems and methods for replicating all or part of a data store are described. According to one embodiment, a system and method for providing a data store of stored events, wherein the events comprise user interactions with articles, identifying a desired portion of the data store for replication, and replicating the structure and content of the desired portion of the data store is described.

45 Claims, 3 Drawing Sheets

OTHER PUBLICATIONS

Bradenbaugh, F., "Chapter 1 The Client-Side Search Engine," *JavaScript Coobbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-technologies.com/products/devonthink.php, printed Mar. 16, 2004.

dtSearch® -http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e . . . , pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm . . . , pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital. p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburg, PA, Jun. 20-24, 1998, pp. 50-57.

* cited by examiner

SYSTEMS AND METHODS OF REPLICATING ALL OR PART OF A DATA STORE

FIELD OF THE INVENTION

The invention generally relates to search engines. More particularly, the invention relates to methods and systems for replicating all or part of a data store.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of system resources when operational, resulting in slower performance of the client device.

Additionally, conventional client-device search applications can require an explicit search query from a user to generate results, and may be limited to examining file names or the contents of a particular application's files.

SUMMARY

Embodiments of the present invention comprise methods and systems for replicating all or part of a data store. One embodiment comprises a method of providing a data store of stored events, wherein the events comprise user interactions with articles, identifying a desired portion of the data store for replication, and replicating the structure and content of the desired portion of the data store.

This exemplary embodiment is mentioned not to limit or define the invention, but to provide an example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention provides systems and methods for replicating a data store. For example, one embodiment of the present invention can determine a portion of a data store on a client device and can cause that portion to be replicated to another data store.

System Architecture

Figure 1:
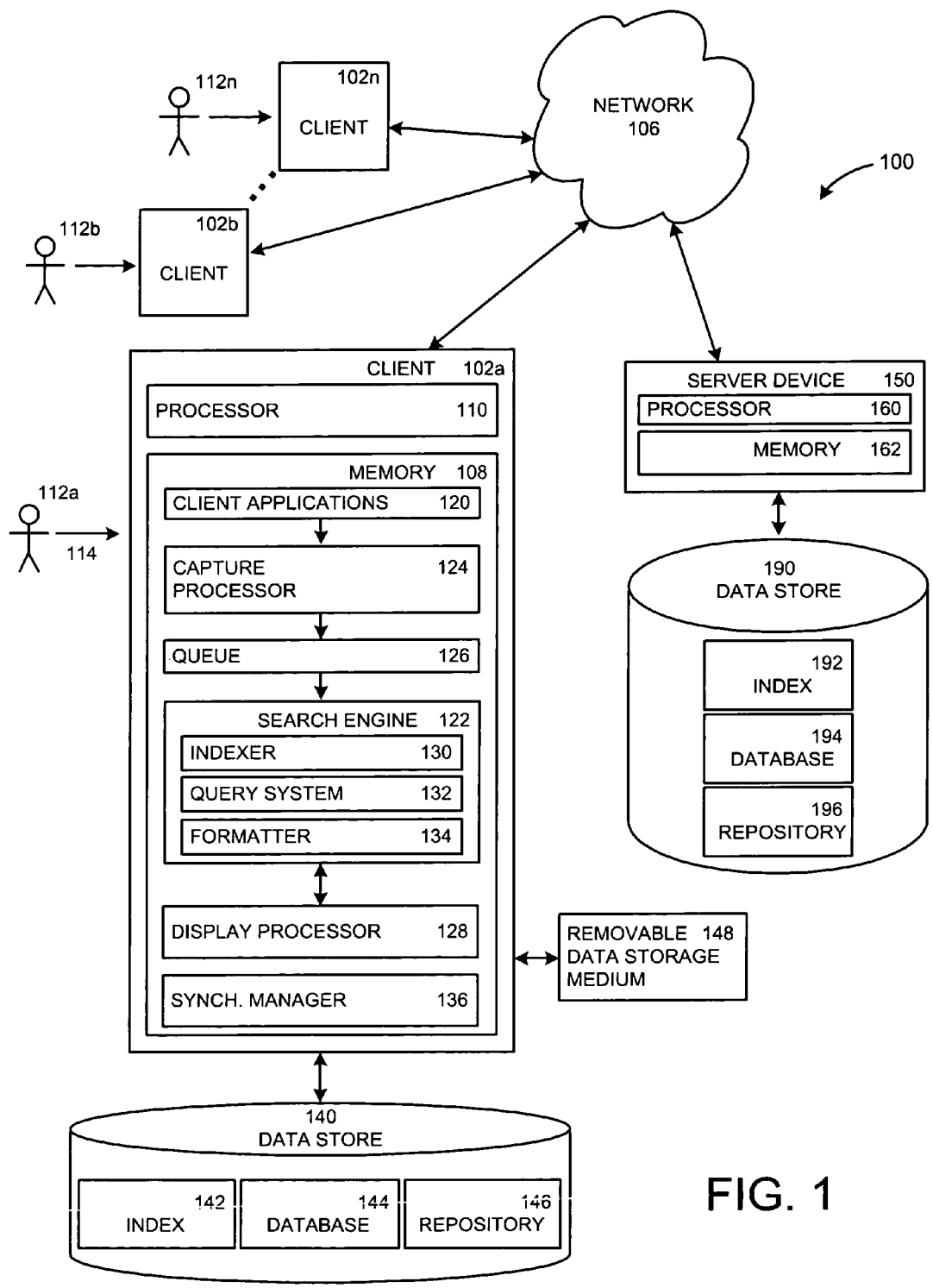
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102*a-n* that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102*a-n* shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102*a-n* can be coupled to a network 106, or alternatively, can be stand alone machines. Client devices 102*a-n* may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a shown can contain a capture processor 124, a queue 126, a synchronization manager 136, and a search engine 122. The client device 102a can also contain or is in communication with a data store 140. The individual system components will be discussed more fully below; but briefly, the capture processor 124 can capture events and pass them to the queue 126. The synchronization manager 136 can send events to the multiple client devices 102b-n or the server device 150. The synchronization manager 136 can determine a desired portion of an associated data store for replication. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include sending or receiving an email message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the receipt of an email message by the user 112a can comprise the sender of the message, the recipients of the message, the time and date the message was received, and the content of the message. Event data for an event can also include location information associated with the location of the client device when the event occurred. Location information can include one or more of a local time, location coordinates, a geographical location, and/or a physical location. Location coordinates can include longitude and latitude coordinates and/or grid coordinates of the client device. The geographical location can include a city, state, and/or country. The physical location can include the user's home, the user's office, a particular location, such as, for example, an airport or a restaurant. In the embodiment shown in FIG. 1, the capture processor 124 can comprise multiple capture components. For example, the capture processor 124 shown in FIG. 1 comprises a separate capture component for each client application in order to capture events associated with each application. The capture processor 124 can also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102*a*. An individual capture component can monitor multiple client applications and multiple capture components can monitor different aspects of a single client application.

The capture processor 124 shown in FIG. 1 also comprises a separate capture component that monitors overall network activity in order to capture event data associated with network activity, such as the receipt of an instant messenger message. The capture processor 124 shown also comprises a separate client device capture component that monitors overall client device performance data, such as processor load, idle time, disk access, the client applications in use, and the amount of memory available.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an email message event received by the user 112*a* can include the sender, the recipient or list of recipients, the time sent, the date sent, and the content of the message. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired. An event schema can also contain location information as described above.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102*a* was operational or because no capture component existed for a specific type of historical event at the time the event took place. Examples of historical events include the user's saved word processing documents, media files, presentation documents, calendar entries, and spreadsheet documents, the emails in a user's inbox, and the web pages book-marked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102*a*. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

The embodiment shown in FIG. 1 further comprises a removable data storage medium 148. The removable data storage medium 148 can be any type of computer-readable media including but not limited to flash memory, a floppy disk, CD-ROM, DVD, magnetic disk, memory chip, ROM, RAM, an ASIC, a configured processor, all optical media, all magnetic tape or other magnetic media, or any other medium from which a computer processor can read instructions. The removable data storage medium 148 may include any one or combination of methods for storing data, including without limitation, arrays, hash tables, lists, and pairs, and may include compression and encryption. The removable data storage medium 148 can store all or a part of the data stored in the index 142, database 144, or the repository 146.

The data store 140 can comprise a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the user 112a using the client device 102a, or articles otherwise associated with the user 102a or the client device 102a. The local index may be stored in a client machine, such as in data store 140, in a data store on a local network in a manner accessible by the client machine, on a server accessible to the client machine through the Internet, or in another accessible location.

In contrast, a global index comprises may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

In the embodiment shown in FIG. 1, when the indexer 130 receives an event, the indexer 130 can determine, from the event schema, terms (if any) associated with the event, location information associated with the event (if available), the time of the event (if available), images (if any) associated with the event, and/or any other information defining the event. The indexer 130 can also determine if the event relates to other events, and associate the event with related events. The terms and times associated with the event can be sent to and incorporated in the index 142 of the data store 140. The event can be sent to the database 144 for storage and the content of the associated article and any associated images can be stored in the repository 146. The indexer 130 can further prepare a desired portion of the data store 140 for replication based at least in part on data received from the synchronization manager 136 identifying the desired portion of the data store 140 for replication. For example, the indexer 130 can computer a checksum to ensure that the data store 140 is synchronized. Additionally, the indexer 130 can replicate a desired portion of the data store 140. For example, if the user 112a desires to create an archive of email events, the indexer 130 can prepare a portion of the data store 140 associated with email events for replication and then replicate the desired portions to the removable data storage medium 148.

The indexer 130 can send and incorporate the terms and location information, associated with the event in the index 142 of the data store 140. The event can be sent to the database 144 for storage and the content of the associated article and any associated images can be stored in the repository 146. The conversation object associated with email messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112*a* or client device 102*a*, such as the user's emails, word processing documents, instant messenger messages, previously viewed web pages and any other article or portion of an article associated with the client device 102*a* or user 112*a*. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112*a*, such as web pages not previously viewed by the user 112*a*.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102*a*. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including as, for example, DLL exports, COM interface, VB, JAVA, or NET libraries, or a web service.

The synchronization manager 136 can instruct the indexer 130 to replicate all or a portion of the data store 140 based on input from the user 112*a*, or other suitable source, indicating a desired portion of the data store 140 for replication. For example, the synchronization manager 136 can present the user 112*a* with a graphical user interface, textual user interface, or other suitable interface that allows the user 112*a* to indicate a portion of the data store 140 that the user 112*a* wishes to replicate. For example, the user 112*a* may desire to create an archive of all email events. The user 112*a* can choose email events from a graphical user interface containing, for example, listings of various event types which the synchronization manager 136 presents to the user 112*a*. The synchronization manager 136 can then communicate the user's 112*a* selection to the indexer 130 and cause the indexer 130 to transfer the selected portion to another storage device such as the removable data storage medium 148, which can comprise, for example, a flash memory, a CD or DVD.

Alternatively, the synchronization manager 136 can instruct the indexer 130 to replicate a portion of the data store 140 based on a query entered by the user 112*a*. For example, the user 112*a* can enter a search query for all articles related to a particular subject. For example, the user 112*a* can enter a search query "New York, 9-11-01." The search engine 122 can then locate multiple types of articles related to the query. Locating articles related to the query can comprise, for example, a keyword search and methods that extend beyond a keyword search. Methods extending beyond a keyword search can comprise, for example, locating frequently occurring terms other than the actual search terms that appear in relevant articles and then extending the search based on the frequently occurring terms. For example, the user 112*a* can enter the search terms "New York, 9-11-01," and the search engine 122 can locate articles according to a keyword search that contain the terms "New York" and "9-11-01." The search engine can then extrapolate the search by identifying frequently occurring words within the documents containing the words "New York" and "9-11-01." For example, the words "twin towers," "terrorists," and "World Trade Center" can occur frequently in the articles containing the terms "New York, 9-11-01." The search engine 122 can locate additional articles containing the terms "twin towers," "terrorists," and "World Trade Center" so that a set of articles determined to relate to the query "New York, 9-11-01" extends beyond a set of articles simply containing the actual search terms and encompasses other articles relevant to the search query that do not contain the actual search terms. The search engine 122 can instruct the synchronization manager 132 to cause the transfer of all articles determined to be relevant to the search query.

Moreover, the synchronization manager 136 can allow the user 112*a* to indicate a maximum size for the data store 140 or the removable data storage medium 148. The maximum size can then be used by the indexer 130 to limit the amount of data transferred or stored in the removable data storage medium 148. The indexer 130 can limit the amount of data transferred or stored in the data storage medium 148 by compressing files, by deleting old or infrequently accessed information, by truncating images or other information associated with a file, or by archiving portions of data to an additional storage medium.

Through the client devices 102*a-n*, users 112*a-n* can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112*a* can also enter a search query in a search engine interface, which can be transmitted to the server device 150 by the client device 102*a* via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102*a-n*, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment the server device 150 may exist on a client-device. In still another embodiment, there can be multiple server devices 150. The server device 150 can be in communication a data store 190. The data store 190 can comprise an index 192, a database 194, and a repository 196. The data store can receive events and associated data from the client 102*a*. Terms and times associated with events can be sent to and incorporated in the index 192 of the data store 190. Events can be sent to the database 194 for storage and the content of the associated article and any associated images can be stored in the repository 196.

It should be noted that other embodiments of the present invention may comprise systems having different architecture than that which is shown in FIG. 1. For example, in some other embodiments of the present invention, the client device 102a is a stand-alone device that is not permanently coupled to a network. The system 100 shown in FIG. 1 is merely exemplary, and is used to explain the exemplary methods shown in FIG. 2-3.

Processes

Various methods in accordance with the present invention may be carried out. For example, one embodiment comprises providing a data store of stored events, wherein the events comprise user interactions with articles on the client device, identifying a desired portion of data store for replication, and replicating the desired portion of the data store. According to some embodiments, the data store can comprise a database, index, or repository. According to some embodiments, identifying the desired portion of the data store can comprise presenting the user with a graphical user interface, presenting a user with suggested events, determining frequently accessed or recently accessed articles, or determining articles relevant to a search query. According to some embodiments, determining an article relevant to a search query can comprise extending a search query beyond initial search terms. According to some embodiments, a maximum size for a replicated portion of a data store can be determined. According to some embodiments, preparing the desired portion of the data store can comprise determining a checksum associated with the database, index, and repository or determining profile information associated with desired portion. According to some embodiments, replicating the desired portion of the data store comprises indicating a replicated portion as read-only. According to some embodiments the desired portion of the data store can be replicated to a removable data store or to a data store on a network.

Figure 2:
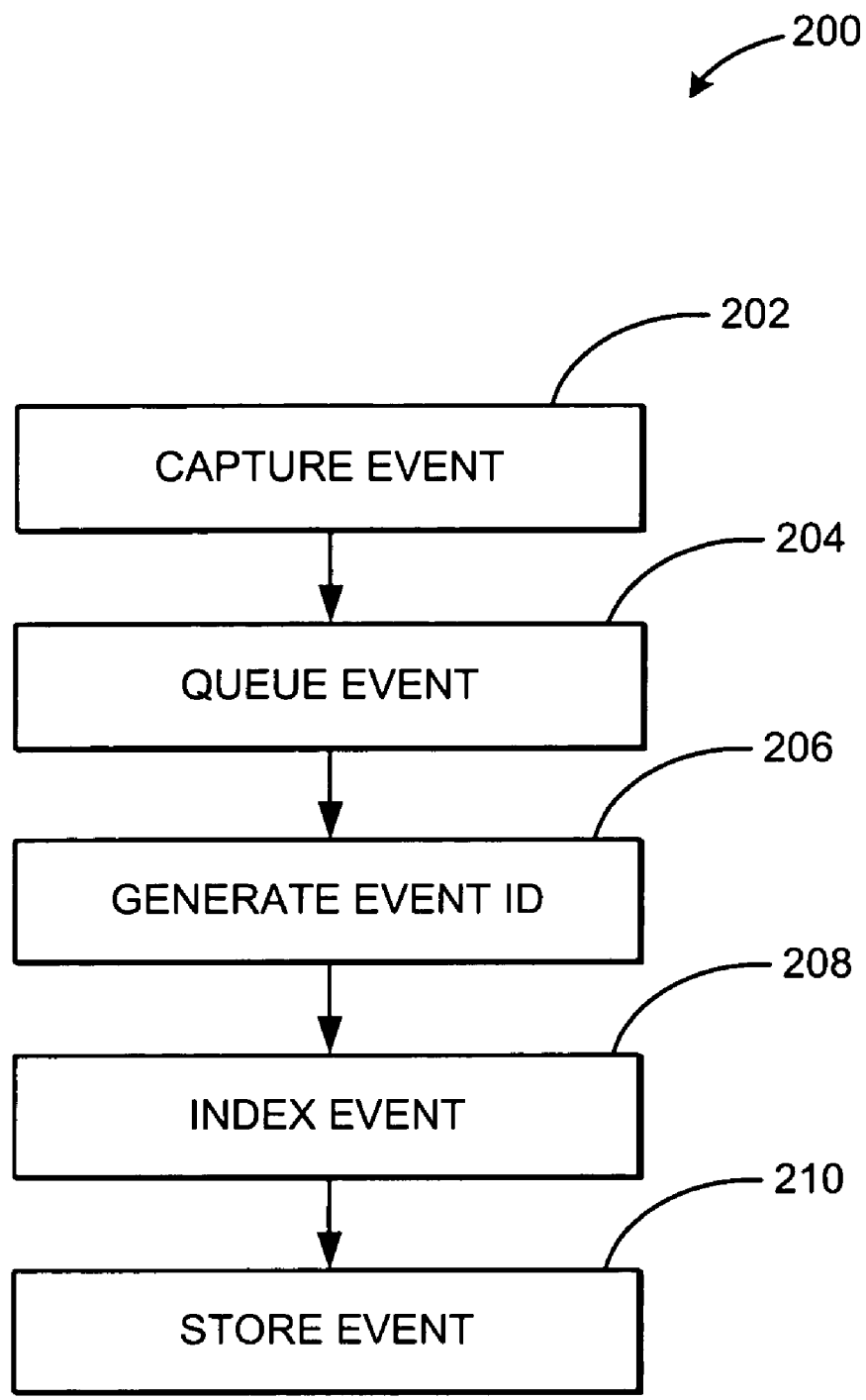
FIG. 2 illustrates a flow diagram of a method in accordance with one embodiment of the present invention.

FIG. 2 illustrates an exemplary method 200 that provides a method for capturing and storing an event. The method 200 begins with block 202, in which an event can be captured. In block 202, the event can be captured by the capturing processor 124. Examples of events that may be captured include viewing a web page, saving a word processing document, composing an email, printing a spreadsheet, sending an instant messaging message, or any other event generating activity on client 102a. In one embodiment, an event is captured by compiling event data associated with the event in an event schema.

Once the event is captured in block 202, it can be sent to the queue 126 in block 204. In block 204, the event can be queued until it is ready to be received by the indexer 130 within the search engine 122. In some embodiments, it is not necessary to send events to a queue 126. The embodiment depicted in FIG. 1 comprises the queue 126 to improve performance of the client 102a and prevent overuse of system resources. Thus, according to the embodiment depicted in FIG. 1 and the method 200 of FIG. 2, events can be sent to the queue 126 to better regulate the processing of events by the search engine 122.

Block 204 is followed by block 206, in which an event ID can be generated for an event pulled from the queue 126. When an event is pulled from the queue 126, a check can be executed to determine whether an identical event already exists. If it does not, the indexer 130 will generate an event ID for the event. The event ID is a unique identifier associated with an event that can be used to reference the event in the index 142. Because the event ID can comprise much less memory space than the event with which it is associated, it is more efficiently stored in the index 142 and is more efficiently searched by the search engine 122 than the event with which it is associated. For example, the event captured in block 202 may comprise data relating to the title of an article, the time the article was edited, the location of the article, and text contained in the article. The event ID associated with this event in block 206 may comprise, for example, a single integer.

Block 206 is followed by block 208, in which the event captured in block 202 can be indexed. The event ID can be used in the index 142 to associate terms appearing in the event with the event. For example, suppose the event captured in block 202 contains a phrase "budget meeting" and that in block 206 the event ID that is associated with the event is a number "42." According to the method 200, in this example a term "budget" and a term "meeting" within the index 142 can each be referenced to the event ID "42." Thus, in this example, the event captured in block 202 that contains the phrase "budget meeting" will be associated with the term "budget" and the term "meeting" within the index 142 by way of the event ID "42" that was assigned in block 206.

Block 208 is followed by block 210 in which the event captured in block 202 is stored in the database 144 of the data store 140. The event stored in the database 144 during block 210 is associated with the event ID which allows the terms in the event to be indexed in the index 142 while the event itself is stored in the separate database 144. Other embodiments of the present invention could combine the index 142 and the database 144 or store the events in the index without the use of an event ID.

Figure 3:
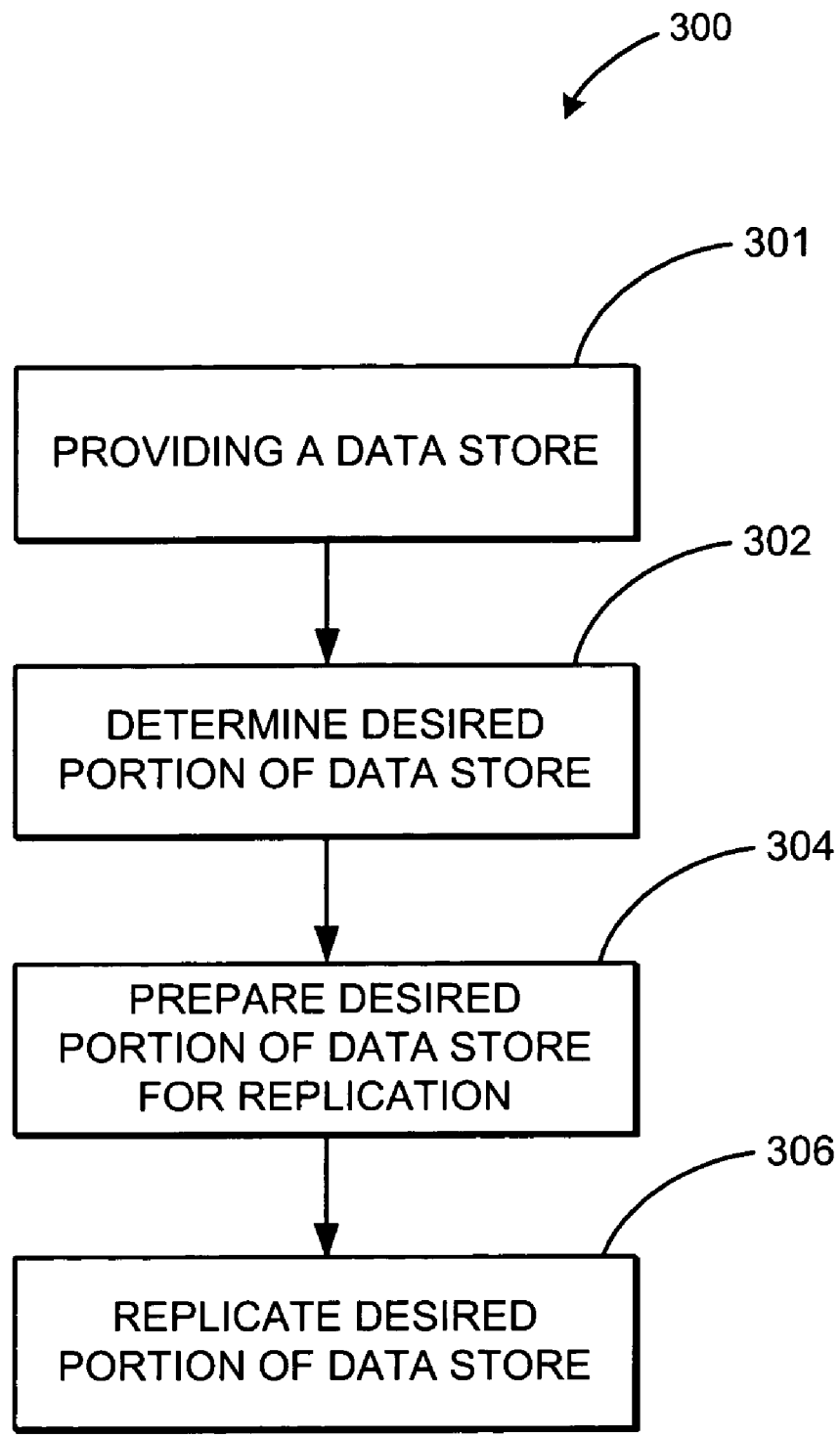
FIG. 3 illustrates a flow diagram of a second method in accordance with one embodiment of the present invention.

FIG. 3 illustrates an exemplary method 300 for identifying a desired portion of the data store 140, preparing the data store 140, and replicating the data store 140. In one embodiment, the data store 140 comprises a database of events 144, an index of terms associated with events 142, and a repository of content associated with the events 146. The method 300 is described in reference to the system illustrated in FIG. 1, but the method 300 can be carried out in other systems as well. The method 300 begins in block 301 in which the data store 140 is provided. The data store 140 can be provided by constructing the data store 140, such as by the method 200 illustrated in FIG. 2, or by establishing communication with the data store 140.

After a data store is provided, the method 300 proceeds to block 302, wherein the synchronization manager 136 receives a request from the user 112a indicating a desired portion of data store 140 for replication. The desired portion of the data store 140 can comprise all or a portion of the data store 140 that the user 112a wishes to transfer to another client device, create a backup copy of, or replicate for another purpose. Additionally, the desired portion of the data store 140 can reflect an automatically selected portion of the data store 140 selected based on a selection criteria. The selection criteria can include for example, recently edited files, frequently accessed files, or files based on some other suitable selection criteria. For example, if the user 112a desires to create a backup of frequently edited documents, the user 112a can set a selection criteria to select all articles edited more than a certain number of times.

Additionally, the synchronization manager 136 can determine a desired portion of the data store 140, for example, by presenting to the user 112a a graphical, textual, or other suitable user interface. The interface can present the user 112a with a variety of selection options including, for example, types of events, event schemas, or suggested events. Types of events can comprise, for example, a listing of types of events contained in the database 144. For example, if the database 144 contains email events, text document events, instant messaging events, and web page events, the synchronization manager 136 can display an interface to the user 112a that would list event types "emails," "text documents," "instant messages," and "web pages." The user 112a can select one or more of the listed event types, for example, by clicking on or otherwise selecting the listed event type. The synchronization manager 136 can display event schemas that comprise, for example, a listing of fields contained within an event type. For example, for an email event type, a schema can comprise a "To:" field, a "From:" field, a "Re:" field, and other suitable fields. The user 112a can select from the schema desired portions of an indexed event, for example, by clicking on or otherwise selecting a link to the desired portion. Suggested events can comprise, for example, events determined by the synchronization manager 136 to reflect likely useful events to the user 112a. For example, the synchronization manager 136 can determine that events associated with recently viewed or frequently viewed articles are likely to be of interest to the user 112a and present these events as suggested events to the user 112a.

Alternatively, the synchronization manager 136 can determine a desired portion of the data store 140 based on rules or default options. Rules can comprise, for example, instructions that the user 112a determines in advance to indicate desired portions of the of the data store 140. For example, the user can initially indicate events or articles that the user 112a desires to keep for archival purposes or for ready access from multiple client devices. For example, the user 112a can desire to keep a backup copy of all email events or desire to have access to all email events from multiple client devices. The user 112a can create a rule through the synchronization manager 136 such that email events will automatically be selected during block 302 of the method 300. Additionally, the synchronization manager 136 can have a default setting. A default setting can include, for example, event types or articles to copy based on a predetermined schedule or type. For example, the synchronization manager 136 can automatically select all email events and web page events during block 302 absent any indication from the user 112a.

Once the synchronization manager 136 determines a desired portion of the data store 140, the method 300 proceeds to block 304 wherein the indexer 130 prepares the data store 140 for replication. Preparing the data store 140 for replication can comprise, for example, determining a checksum or other integrity-protection measure for the data store 140. The checksum or other integrity-protection measure can include, for example, a sum of bytes or other suitable data component that ensures the index 142 is synchronized with the database 144 and the repository 146. Additionally, preparing the data store 140 for replication can comprise determining profile information associated with the data store 140. Profile information can comprise, for example, the user's 112a name, preferences, and other settings and data unique to the user 112a.

Once the indexer 130 prepares the data store 140 for replication, the method 300 proceeds to block 306 wherein the indexer 130 replicates the data store 140. The indexer 130 can replicate the data store 140 by duplicating the file structure and content in a manner that can be interpreted by the indexer 130 on the client device 102a or other client device containing an indexer 130. Also, the indexer 130 can copy the profile information determined by the synchronization manager 136. The profile information can be used to identify to the indexer 130 with which user the data store 140 is associated. The user with which the data store 140 is associated can be presented to the user 112a, for example, along with search results. For example, the user 112a can use the client device 102a and insert a removable data storage medium 148 from a user 112b containing a data store 140b associated with the user 112b. The search engine 122 on the client device 102a can then determine search results from both the data store 140 associated with the user 112a and the data store 140b associated with the user 112b.

For example, the search engine 122 can determine that one email event from the data store 140 and two web page events from the data store 140b are associated with a search query. The formatter 134 can cause the one email and the two web pages to be presented to the user 112a in a way that designates that the one email is associated with the user 112a and that the two emails are associated with the user 112b. For example, a link to the email can appear in a column titled with a name of the user 112a and a link to the two emails can appear in a column titled with a name of the user 112b.

The indexer 130 can replicate the data store 140 onto the removable data storage medium 148. For example, the removable data storage medium 148 can comprise a flash memory device which the user 112a connects to the client 102a. The indexer 130 can replicate the desired portion of the data store 140 onto the flash memory device. The user 112a can disconnect the removable flash memory device and transfer the device to another client. Additionally, the indexer 130 can mark the data store 140 as a read-only file. Read-only files comprise files that are configured to communicate information to a computer functionality but are not configured to receive information from a computer functionality. The indexer 130 can cause the removable data storage medium 148 to be marked as read-only, for example, by a physical indication, a program code indication, or other suitable indication. According to some embodiments, the data store 140 can be replicated to the data store 190 over the network 106.

Once the indexer 130 replicates the data store 140, the method 300 ends. The replicated portion of the data store 140 on the removable data storage medium 148 can be used for a variety of uses by the user 112a. For example, the user 112a can transfer the removable data storage medium 148 to another client device where the user 112a desires to access the event data associated with the client device 102a. Thus, the user 112a can work on one client device while at home and generate articles such as emails and text documents on the home client device, and an index and repository of the emails and text documents can be stored on the home client device. The user 112a can then select the emails and text documents to be replicated to the removable data storage medium 148. The user 112a can take the removable data store to a second client device, at an office for example, and conduct searches encompassing the emails and text documents generated on the home client device while using the second client device at the office. Additionally, the replicated portion of the data store 140 can be used as an archive of important information. For example, all email events can be replicated to the removable data storage medium 148 and kept as a backup copy.

Also, the replicated portion of the data store 140 can be exchanged between users. For example, the user 112a can be working on a project with the user 112b and desire to share emails and text documents with the user 112b related to the project. The user 112a can select emails and text documents related to the project according to the method described in block 302. A portion of the data store 140 associated with the emails and text documents can then be prepared and replicated to the removable data storage medium 148 according to the method described in block 304 and 306. The user 112a can then give the removable data storage medium 148 to the user 112*b* who can then connect it with the client 102*b*. A search engine 122*b* on the client 102*b* can then perform a search based on the data store contained on the removable data storage medium 148 and a data store 140*b* in communication with the client 112*b*. For example, the user 112*b* can desire to find all emails to a third person working on the project. The user 112*b* can enter a search query received by the search engine 122*b*. The search engine 122*b* can then search the data store on the removable data storage medium 148 associated with the emails and text documents of the user 112*a* as well as the data store on the client 102*b* associated with emails and text documents of the user 112*b*. The formatter 134 can cause results from the search engine 122*b* to be presented to the user 112*b* in a format that allows the user 112*b* to see all the results and distinguish between results from the user's 112*a* index and the user's 112*b* index.

Users can also exchange portions of a data store over a peer-to-peer network. For example, the synchronization manager can allow the user 112*a* to designate a portion of the data store 140 for sharing on a peer-to-peer network. The user 112*b* can then enter a search query on the client 102*b* and the search engine 122*b* can access the portion of the data store 140 designated for sharing. This allows the search engine 122 in a peer-to-peer environment, or other suitably networked environment, to expand a set of searchable articles. For example, the search engine 122 can receive from the user 112*a* a designation designating a portion of the data store 140 as "non-private," which can indicate that the user 112*a* is willing to share the portion of the data store 140 with other client devices. The user 112*b* can enter a search term and the search engine 122*b* can search articles on the data store 140*b* and articles in the data store 140*a*. The synchronization manager 136 can also enable information trading between client devices. For example, the user 112*a* can agree to allow the user 112*b* to access files on the client 102*a*, in exchange for the user 112*b* allowing the user 112*a* to access files on the client device 102*b*. In this example, the synchronization manager 136 can cause information from the client device 102*a* to be sent to the client device 102*b* and information from the client device 102*b* to be sent to the client device 102*a*.

General

While the above description contains many specifics, these specifics should not be construed as limitations on the scope of the invention, but merely as exemplifications of the disclosed embodiments. Those skilled in the art will envision many other possible variations that are within the scope of the invention.

The invention claimed is:

1. A method, comprising:
providing a data store of stored events, wherein the events comprise data describing user interactions with articles, wherein the articles are associated with a plurality of different applications;
providing an index of the stored events, wherein the index is a part of the data store;
identifying a desired portion of the data store for replication, the identifying comprising:
identifying a first result set of articles relevant to a search query;
identifying frequently occurring terms within the articles in the first result set;
identifying a second result set of articles based at least in part on the frequently occurring terms;
identifying stored events associated with the articles in the second result set for replication; and
identifying a portion of the index associated with the identified stored events for replication;
replicating the desired portion of the data store; and
storing the replicated portion on a storage medium.

2. The method of claim 1, wherein the index comprises a plurality of terms associated with the events.

3. The method of claim 1, wherein the index comprises one or a combination of one or more times, one or more types, one or more locations, one or more articles, or one or more user activities associated with the events.

4. The method of claim 3, wherein the articles comprise one or a combination of word processor documents, spreadsheet documents, presentation documents, emails, instant messenger messages, database entries, calendar entries, appointment entries, task manager entries, source code files, web pages, Portable Document Format (PDF) files, media files, audio files, or video files.

5. The method of claim 1, wherein the data store comprises a database.

6. The method of claim 5, wherein the database comprises events.

7. The method of claim 1, wherein the data store comprises a repository.

8. The method of claim 7, wherein the repository comprises content associated with the articles.

9. The method of claim 1, wherein identifying a desired portion of the data store comprises presenting a user with a graphical user interface.

10. The method of claim 1, wherein identifying a desired portion of the data store comprises presenting a user with suggested events.

11. The method of claim 1, wherein identifying a desired portion of the data store comprises identifying frequently accessed articles.

12. The method of claim 1, further comprising determining a maximum size for a replicated portion of the data store.

13. The method of claim 1, wherein identifying a desired portion of the data store comprises determining recently accessed articles.

14. The method of claim 7, further comprising determining a checksum associated with the index and the repository.

15. The method of claim 1, further comprising determining profile information associated with the desired portion, the profile information identifying a user associated with the data store.

16. The method of claim 1, wherein replicating the desired portion of the data store comprises indicating a read-only status.

17. The method of claim 1, wherein the desired portion of the data store is replicated to a removable data store.

18. The method of claim 17, wherein the data store is a local data store on a client device.

19. The method of claim 1, wherein the desired portion of the data store is replicated to a second data store located on a network.

20. The method of claim 19, wherein the data store is a local data store on a client device.

21. A computer readable storage medium containing program code comprising:
program code for providing a data store of stored events, wherein the events comprise data describing user interactions with articles, wherein the articles are associated with a plurality of different applications;

program code for providing an index of the stored events, wherein the index is a part of the data store;

program code for identifying a desired portion of the data store for replication, the identifying comprising:

identifying a first result set of articles relevant to a search query;

identifying frequently occurring terms within the articles in the first result set;

identifying a second result set of articles based at least in part on the frequently occurring terms;

identifying stored events associated with the articles in the second result set for replication; and identifying a portion of the index associated with the identified stored events for replication;

program code for replicating the desired portion of the data store; and program code for storing the replicated portion on a storage medium.

22. The computer-readable medium of claim 21, wherein the index comprises a plurality of terms associated with the events.

23. The computer-readable medium of claim 21, wherein the index comprises one or a combination of one or more times, one or more types, one or more locations, one or more articles, or one or more user activities associated with the events.

24. The computer-readable medium of claim 23, wherein the articles comprise one or a combination of word processor documents, spreadsheet documents, presentation documents, emails, instant messenger messages, database entries, calendar entries, appointment entries, task manager entries, source code files, web pages, Portable Document Format (PDF) files, media files, audio files, or video files.

25. The computer-readable medium of claim 21, wherein the data store comprises a database.

26. The computer-readable medium of claim 25, wherein the database comprises events.

27. The computer-readable medium of claim 21, wherein the data store comprises a repository.

28. The computer-readable medium of claim 27, wherein the repository comprises content associated with the articles.

29. The computer-readable medium of claim 21, wherein identifying a desired portion of the data store comprises presenting a user with a graphical user interface.

30. The computer-readable medium of claim 21, wherein identifying a desired portion of the data store comprises presenting a user with suggested events.

31. The computer-readable medium of claim 21, wherein identifying a desired portion of the data store comprises identifying frequently accessed articles.

32. The computer-readable medium of claim 21, further comprising program code for determining a maximum size for a replicated portion of the data store.

33. The computer-readable medium of claim 21, wherein identifying a desired portion of the data store comprises determining recently accessed articles.

34. The computer-readable medium of claim 27, further comprising program code for determining a checksum associated with the index and the repository.

35. The computer-readable medium of claim 21, further comprising program code for determining profile information associated with the desired portion, the profile information identifying a user associated with the data store.

36. The computer-readable medium of claim 21, wherein replicating the desired portion of the data store comprises indicating a read-only status.

37. The computer-readable medium of claim 21, wherein the desired portion of the data store is replicated to a removable data store.

38. The computer-readable medium of claim 37, wherein the data store is a local data store on a client device.

39. The computer-readable medium of claim 21, wherein the desired portion of the data store is replicated to a second data store located on a network.

40. The computer-readable medium of claim 39, wherein the data store is a local data store on a client device.

41. A method comprising:

providing a database of stored events, wherein the events comprise data describing user interactions with articles on the client device, and wherein the articles are associated with a plurality of different client applications;

providing an index of the stored events;

providing a repository of at least a portion of content associated with the articles;

identifying a desired portion of the database, index, and repository for replication by presenting a user with a graphical user interface, the identifying comprising:

identifying a first result set of articles relevant to a search query;

identifying frequently occurring terms within the articles in the first result set;

identifying a second result set of articles based at least in part on the frequently occurring terms;

identifying stored events associated with the articles in the second result set for replication; and identifying a portion of the index associated with the identified stored events for replication;

determining a checksum associated with the database, index, and repository;

determining profile information associated with the database, index, and repository;

replicating the structure and content of the desired portion of the database, index, and repository to create a replicated portion;

storing the replicated portion on a storage medium; and marking the replicated portion as read-only.

42. The method of claim 15, wherein the profile information is replicated with the desired portion of the data store and further comprising:

providing a second data store of stored events, the second data store having associated profile information identifying a second user associated with the second data store;

identifying articles associated with the stored events in the replicated portion and articles associated with the stored events in the second data store related to a search query;

simultaneously displaying the identified articles associated with the events stored in the replicated portion and the second data store; and displaying profile information corresponding to each identified article, the profile information identifying the user associated with the data store storing the event with which the article is associated.

43. The computer-readable medium of claim 35, wherein the profile information is replicated with the desired portion of the data store and further comprising:

program code for providing a second data store of stored events, the second data store having associated profile information identifying a second user associated with the second data store;

program code for identifying articles associated with the stored events in the replicated portion and articles associated with stored events in the second data store related to a search query;

program code for simultaneously displaying the identified articles associated with the events stored in the replicated portion and the second data store; and program code for displaying profile information corresponding to each identified article, the profile information identifying the user associated with the data store storing the event with which the article is associated.

44. The method of claim 1, wherein the terms are words.

45. The computer readable medium of claim 21, wherein the terms are words.

* * * * *